US009681219B2

(12) United States Patent
Vilermo et al.

(10) Patent No.: US 9,681,219 B2
(45) Date of Patent: Jun. 13, 2017

(54) ORIENTATION FREE HANDSFREE DEVICE

(71) Applicant: Nokia Technologies Oy, Espoo (FI)

(72) Inventors: Miikka Tapani Vilermo, Siuro (FI); Lasse Juhani Laaksonen, Nokia (FI); Antti Eronen, Tampere (FI); Anssi Sakari Ramo, Tampere (FI); Koray Ozcan, Farnborough (GB); Jussi Artturi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 18 days.

(21) Appl. No.: 13/788,007

(22) Filed: Mar. 7, 2013

(65) Prior Publication Data

US 2014/0254817 A1 Sep. 11, 2014

(51) Int. Cl.
*H04M 5/00* (2006.01)
*H04R 1/32* (2006.01)
(Continued)

(52) U.S. Cl.
CPC ............... *H04R 1/32* (2013.01); *H04S 7/304* (2013.01); *H04R 5/033* (2013.01)

(58) Field of Classification Search
CPC ........................................................ H04R 1/32
(Continued)

(56) References Cited

U.S. PATENT DOCUMENTS 5,446,834 A * 8/1995 Deering ............. G02B 27/0093 345/419
7,113,911 B2 * 9/2006 Hinde ..................... G10L 15/30 340/12.54
(Continued)

FOREIGN PATENT DOCUMENTS

DE 10148006 6/2003
EP 2 288 178 A1 2/2011
(Continued)

OTHER PUBLICATIONS

Extended Search Report from corresponding European Patent Application No. 14157738.7, dated Jun. 3, 2014.
(Continued)

*Primary Examiner* — William Deane, Jr.
(74) *Attorney, Agent, or Firm* — Alston & Bird LLP

(57) ABSTRACT

Methods, apparatuses, and computer program products are provided to indicate or automatically configure headphone channel orientation based on a physical orientation determination. An apparatus is provided that is configured to at least determine an orientation of the headphone device; analyze the determined orientation; and provide an indication of the determined orientation or adjust the output channel configuration of the apparatus for the headphone device. The apparatus may be further configured to determine the orientation of the headphone device based on at least one of: a head turn position; a direction of one or more audio signals; a direction of movement, wherein the movement is determined based on a determination of acceleration or trajectory of the headphone device; two or more compass data, wherein at least one compass is located in each of the apparatus and the headphone device; and a difference in characteristics of one or more audio signals.

22 Claims, 13 Drawing Sheets

(51) Int. Cl.
*H04S 7/00* (2006.01)
*H04R 5/033* (2006.01)

(58) Field of Classification Search
USPC .......................................................... 381/309
See application file for complete search history.

(56) References Cited

U.S. PATENT DOCUMENTS

| | | | | | |
|---|---|---|---|---|---|
| 8,238,570 | B2 * | 8/2012 | Johnson, Jr. | H04R 1/1041 381/311 |
| 8,243,946 | B2 * | 8/2012 | Burge | H04R 1/1041 381/74 |
| 8,428,269 | B1 * | 4/2013 | Brungart | H04S 7/304 340/963 |
| 2006/0045294 | A1 * | 3/2006 | Smyth | H04S 7/304 381/309 |
| 2007/0186756 | A1 * | 8/2007 | Sano | G11B 27/11 84/612 |
| 2009/0154720 | A1 | 6/2009 | Oki | |
| 2011/0248954 | A1 | 10/2011 | Hamada et al. | |
| 2011/0293129 | A1 | 12/2011 | Dillen et al. | |
| 2011/0299707 | A1 | 12/2011 | Meyer | |
| 2012/0114132 | A1 * | 5/2012 | Abrahamsson | H04R 1/1016 381/74 |
| 2012/0114154 | A1 | 5/2012 | Abrahamsson | |
| 2012/0128166 | A1 | 5/2012 | Kim et al. | |
| 2012/0154195 | A1 | 6/2012 | Nystrom et al. | |
| 2012/0207308 | A1 | 8/2012 | Sung | |
| 2013/0088581 | A1 | 4/2013 | Arai et al. | |
| 2013/0279724 | A1 * | 10/2013 | Stafford | H04R 5/02 381/309 |
| 2014/0036127 | A1 * | 2/2014 | Pong | H04R 1/028 348/333.01 |
| 2014/0079238 | A1 * | 3/2014 | Bastide | H04R 5/033 381/74 |
| 2014/0086438 | A1 * | 3/2014 | Tachibana | H04R 1/1041 381/309 |
| 2015/0163546 | A1 * | 6/2015 | Weast | H04N 5/76 725/131 |

FOREIGN PATENT DOCUMENTS

| | | |
|---|---|---|
| JP | 2002-135887 | 5/2002 |
| WO | WO 98/59525 A2 | 12/1998 |
| WO | WO 2012/046276 A1 | 4/2012 |

OTHER PUBLICATIONS

"*Headzone PRO v2.1.1*;" Beyer Dynamic; retrieved on Apr. 17, 2013 from <http://europe.beyerdynamic.com/shop/hah/headphones-and-headsets/studio-and-stage/studio-headphones/headzone-pro.html>.

Joffrion, J. M., et al.; "*Sonic Boon: Head Tracking for Using a GPS-Aided MEMS IMU*;" InsideGNSS; dated Jan./Feb. 2006; retrieved from <http://www.insidegnss.com/auto/0106%20Sonic.pdf>.

Long, X., et al.; "*Single-Accelerometer-Based Daily Physical Activity Classification*;" 31st Annual International Conference of the IEEE EMBS; pp. 6107-6110; dated Sep. 2009; retrieved on Apr. 17, 2013 from <https://www2.lirmm.fr/lirmm/interne/BIBLI/CDROM/ROB/2009/EMB_2009/PDFs/Papers/15750927.pdf>.

Song, Y., et al.; "*Speed Estimation From a Tri-axial Accelerometer Using Neural Networks*;" 29th Annual International Conference of the IEEE EMBS; pp. 3224-3227; dated Aug. 2007; retrieved on Apr. 17, 2013 from <http://www.google.com/search?q=speed+estimation+from+a+tri-axial+accelerometer+using+neural+networks&rls=com.microsoft:en-us&ie-UTF-8&oe=UTF-8&startIndex=&startPage=1>.

"*TRACKIR*;" Natural Point; retrieved on Apr. 17, 2013 from <http://www.naturalpoint.com/trackir>.

Xuan, Y., et al.; "*Making Indoor Maps with Portable Accelerometer and Magnetometer*;" Ubiquitous Positioning Indoor Navigation and Location Based Service (UPINLBS); dated Oct. 2010; pp. 1-7; retrieved on Apr. 17, 2013 from <www.ocf.berkeley.edu/~xuanyg/IndoorMap_UPINLBS2010.pdf>.

Office Action for European Application No. 14 157 738.7 dated Oct. 5, 2015.

* cited by examiner

ORIENTATION FREE HANDSFREE DEVICE

TECHNOLOGICAL FIELD

An example embodiment of the present invention relates generally to audio handsfree devices, such as headphones, and more particularly, to the orientation of audio handsfree devices.

BACKGROUND

Users are increasingly using headphones with their mobile devices. Headphones make it possible to provide many applications and usability improvements over hands-free or normal use of mobile devices, such as 3D audio, improved sound quality, improved call quality, improved noise cancellation, navigation with spatial audio, and the like. The main drawback in using headphones for a user is the trouble in putting them on and taking them off. The user always needs to check that the headphones are oriented correctly when putting them on, i.e. that the right speaker cup is placed to the right ear and the left speaker cup is placed to the left ear. This correct orientation is particularly important when listening to audio with spatial content, like stereo, binaural or multichannel audio or when playing games or following driving instructions with artificially spatialized content.

BRIEF SUMMARY

A method, apparatus and computer program product are therefore provided according to an example embodiment of the present invention to indicate or automatically configure headphone channel orientation based on a physical orientation determination. Such embodiments remove the need for a user to look at orientation markings on headphones before putting them on, and instead may provide for automatically correcting the orientation of the headphones.

In one embodiment, an apparatus is provided that includes at least one processor and at least one memory including computer program instructions with the at least one memory and the computer program instructions configured to, with the at least one processor, cause the apparatus at least to determine an orientation of the headphone device; analyze the determined orientation of the headphone device; and provide an indication of the determined orientation or adjust the output channel configuration of the apparatus for the headphone device. In some embodiments, the apparatus may comprise a part of the headphone device or an apparatus separate from the headphone device.

In some embodiments, the at least one memory and the computer program instructions may be further configured to, with the at least one processor, cause the apparatus at least to determine the orientation of the headphone device based on at least one of: a head turn position; a direction of one or more audio signals; a direction of movement, wherein the movement is determined based on a determination of acceleration or trajectory of the headphone device; two or more compass data, wherein at least one compass is located in each of the apparatus and the headphone device; and a difference in characteristics of one or more audio signals.

In some embodiments, the at least one memory and the computer program instructions configured to, with the at least one processor, further cause the apparatus to receive at least two audio signals based on one or more sound sources from two or more microphones associated with a headphone device; determine one or more directions based on the received at least two audio signals; and analyze at least one of the determined one or more directions and the head turn position so as to determine an orientation of the headphone device.

In some embodiments, determining the one or more directions based on the received at least two audio signals may comprise analyzing at least one of: a difference in audio signal levels of the at least two audio signals, a difference in audio signal arrival times of the at least two audio signals, and a difference in audio signal spectrums of the at least two audio signals. In some embodiments, the head turn position may be determined based on at least one of: at least two or more microphone signals, one or more sensors within the headphone device, or a combination of the at least two or more microphone signals and the one or more sensors. In some embodiments, the one or more sensors may comprise at least one of an accelerometer, a compass, or a magnetometer.

In another embodiment, an apparatus is provided that includes at least one processor and at least one memory including computer program instructions with the at least one memory and the computer program instructions configured to, with the at least one processor, cause the apparatus at least to output audio signals on channels of a headphone device; determine a head turn position of the headphone device; analyze at least one of: one or more audio signal characteristics of the channels, and the head turn position, so as to determine an orientation of the headphone device; and provide an indication of the determined orientation of the headphone device or adjust the output channel configuration of the apparatus for the headphone device based on the determined orientation.

In some embodiments, the analysis of the one or more signal characteristics may comprise at least one of: a difference in audio signal levels between the channels relative to the determined head turn position, a difference in audio signal arrival times between the channels relative to the determined head turn position, a difference in audio signal spectrums between the channels relative to the determined head turn position, wherein the difference in the audio signal characteristics is compared to a predetermined threshold In another embodiment, a method is provided that at least includes determining an orientation of a headphone device; analyzing the determined orientation of the headphone device; and providing an indication of the determined orientation or adjusting the output channel configuration of the apparatus for the headphone device.

In some embodiments, the method may further comprise determining the orientation of the headphone device based on at least one of: a head turn position; a direction of one or more audio signals; a direction of movement, wherein the movement is determined based on a determination of acceleration or trajectory of the headphone device; two or more compass data, wherein at least one compass is located in each of the apparatus and the headphone device; and a difference in characteristics of one or more audio signals.

In some embodiments, the method may further comprise receiving at least two audio signals based on one or more sound sources from two or more microphones associated with a headphone device; determining one or more directions based on the received at least two audio signals; and analyzing at least one of the determined one or more directions and the head turn position so as to determine an orientation of the headphone device.

In some embodiments, the method may further comprise determining the head turn position based on at least one of: at least two or more microphone signals, one or more sensors within the headphone device, or a combination of the at least two or more microphone signals and the one or more sensors. In some embodiments, the one or more sensors may comprise at least one of an accelerometer, a compass, or a magnetometer. In some embodiments, determining an orientation of the headphone device may further comprise an analysis of the determined one or more directions or the head turn position relative to a predetermined threshold.

In another embodiment, a method is provided that at least includes outputting audio signals on channels of a headphone device; determining a head turn position of the headphone device; analyzing at least one of: one or more audio signal characteristics of the channels and the head turn position so as to determine an orientation of the headphone device; and providing an indication of the determined orientation of the headphone device or adjusting the output channel configuration of the apparatus for the headphone device based on the determined orientation.

In some embodiments, analyzing the one or more audio signal characteristics may comprise analyzing at least one of: a difference in audio signal levels between the channels relative to the determined head turn position, a difference in audio signal arrival times between the channels relative to the determined head turn position, a difference in audio signal spectrums between the channels relative to the determined head turn position, and wherein the difference in the audio signal characteristics is compared to a predetermined threshold.

In a further embodiment, a computer program product is provided that includes at least one non-transitory computer-readable storage medium bearing computer program instructions embodied therein for use with a computer with the computer program instructions including program instructions configured to determine an orientation of the headphone device; analyze the determined orientation of the headphone device; and provide an indication of the determined orientation or adjust the output channel configuration of the apparatus for the headphone device.

In another embodiment, a computer program product is provided that includes at least one non-transitory computer-readable storage medium bearing computer program instructions embodied therein for use with a computer with the computer program instructions including program instructions configured to determine the orientation of the headphone device based on at least one of: a head turn position; a direction of one or more audio signals; a direction of movement, wherein the movement is determined based on a determination of acceleration or trajectory of the headphone device; two or more compass data, wherein at least one compass is located in each of the apparatus and the headphone device; and a difference in characteristics of one or more audio signals.

In some embodiments, the computer program instructions may be further configured to receive at least two audio signals based on one or more sound sources from two or more microphones associated with a headphone device; determine one or more directions based on the received at least two audio signals; and analyze at least one of the determined one or more directions and the head turn position so as to determine an orientation of the headphone device.

In some embodiments, the computer program instructions may be further configured to output audio signals on channels of a headphone device; determine a head turn position of the headphone device; analyze at least one of: one or more audio signal characteristics of the channels, and the head turn position, so as to determine an orientation of the headphone device; and provide an indication of the determined orientation of the headphone device or adjust the output channel configuration of the apparatus for the headphone device based on the determined orientation.

In another embodiment, an apparatus is provided that includes at least means for determining an orientation of a headphone device; means for analyzing the determined orientation of the headphone device; and means for providing an indication of the determined orientation or adjusting the output channel configuration of the apparatus for the headphone device.

In another embodiment, an apparatus is provided that includes at least means for determining the orientation of the headphone device based on at least one of: a head turn position; a direction of one or more audio signals; a direction of movement, wherein the movement is determined based on a determination of acceleration or trajectory of the headphone device; two or more compass data, wherein at least one compass is located in each of the apparatus and the headphone device; and a difference in characteristics of one or more audio signals.

BRIEF DESCRIPTION OF THE DRAWINGS

Figure 1:
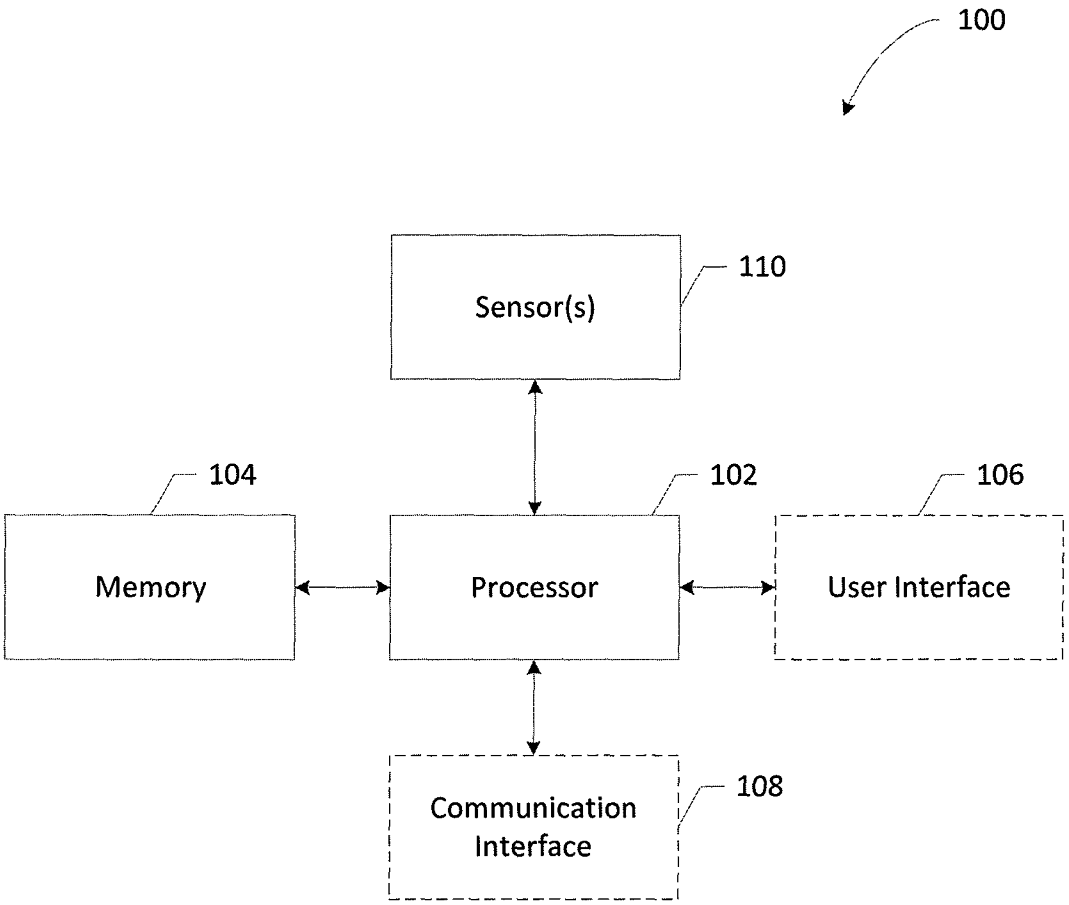
Figure 2:
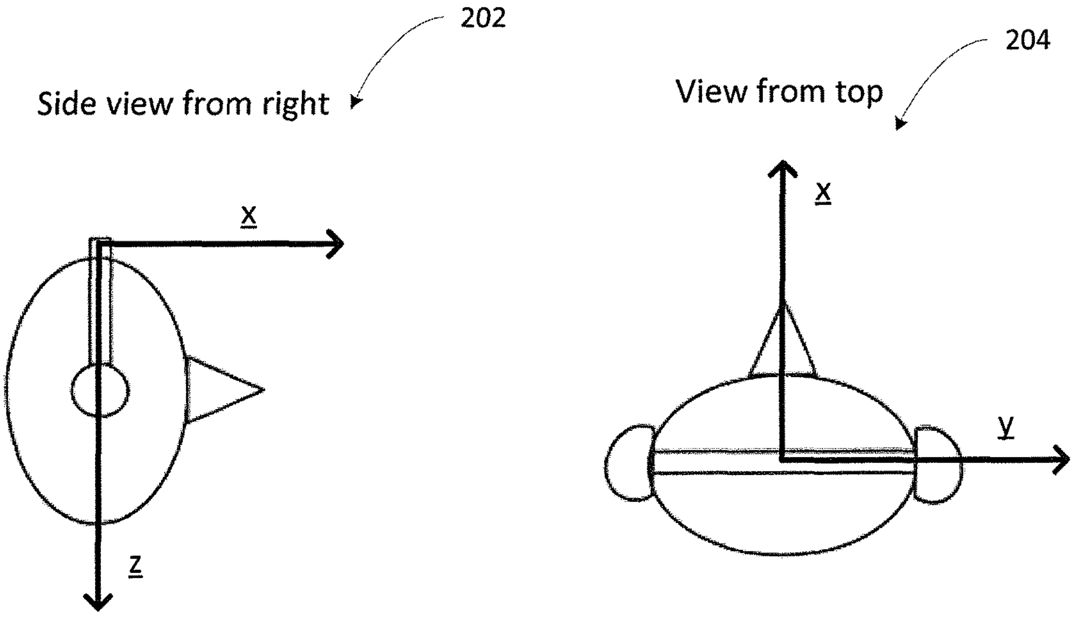
Figure 3:
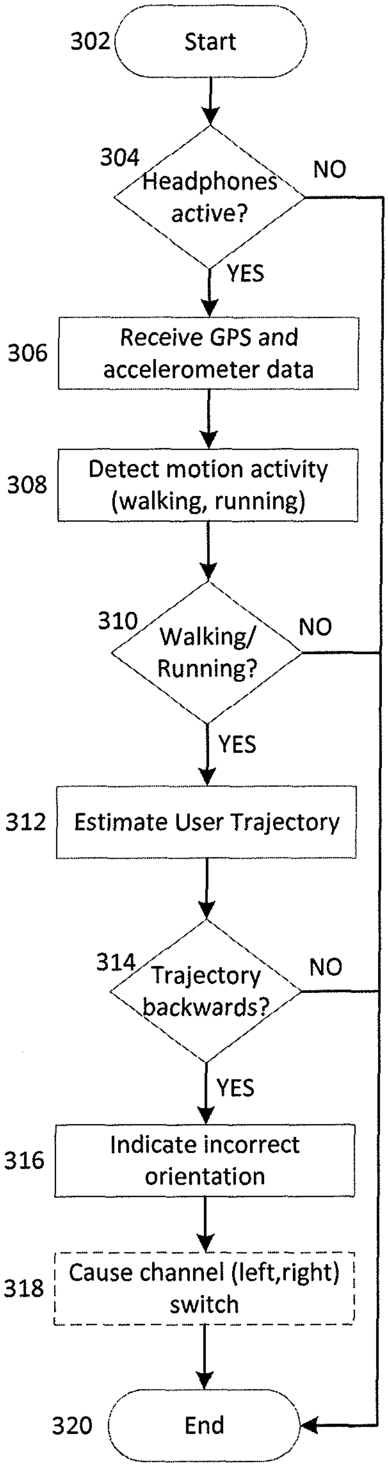
Figure 4:
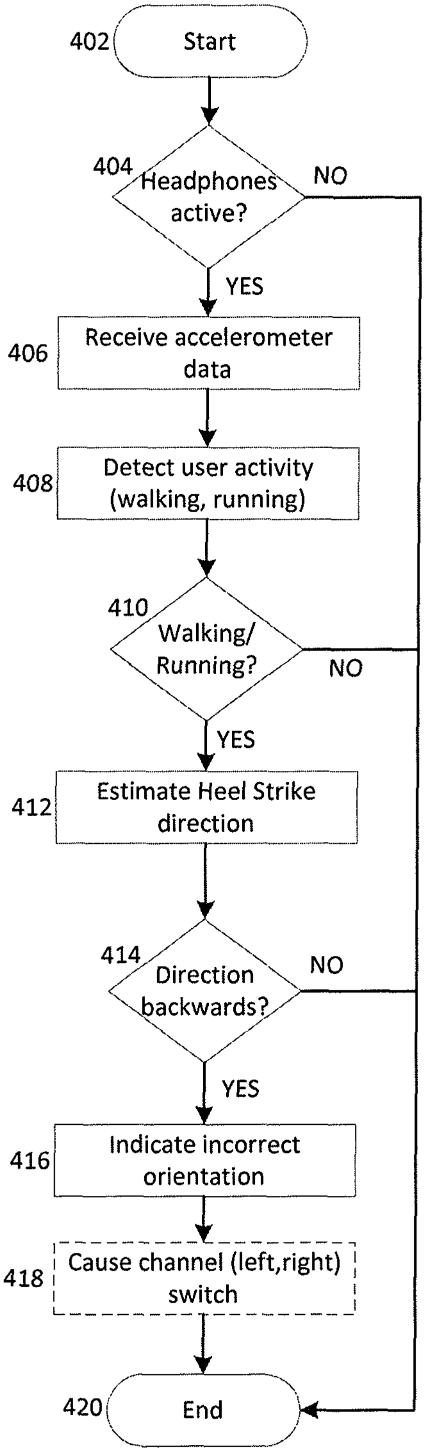
Figure 5:
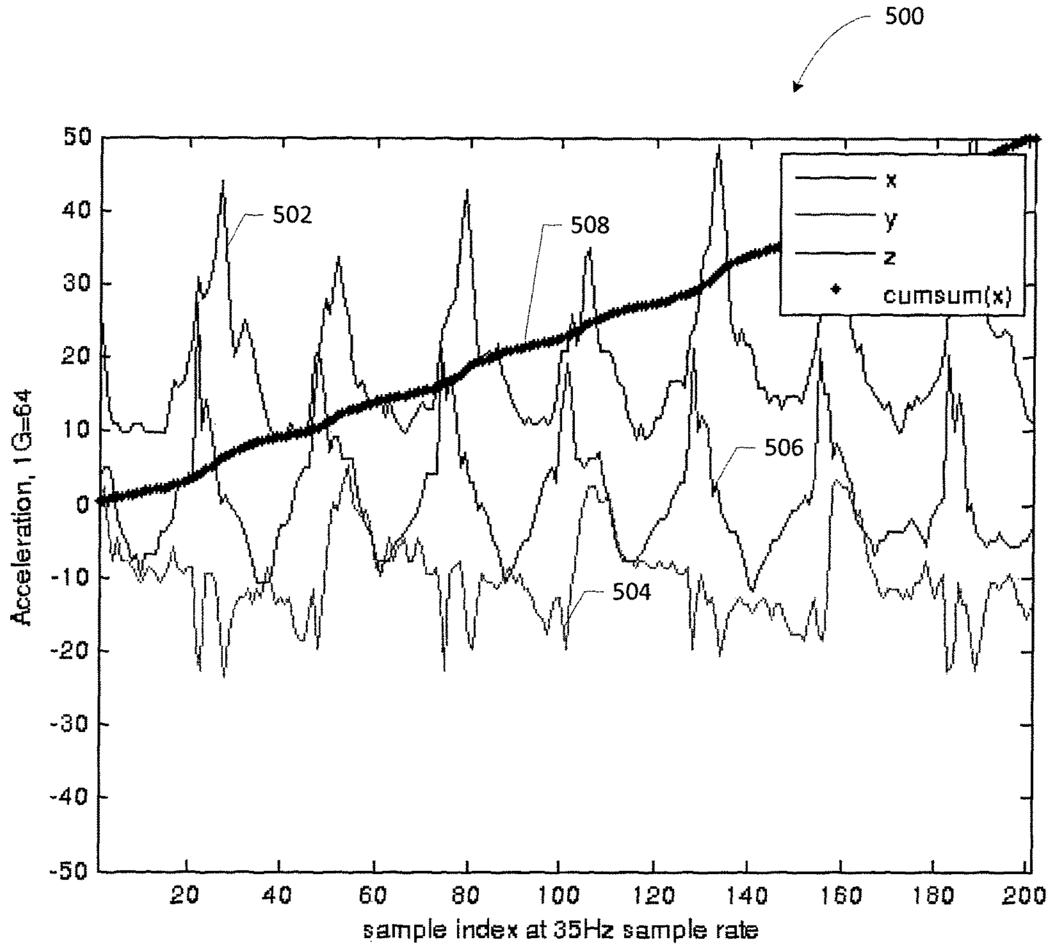
Figure 6:
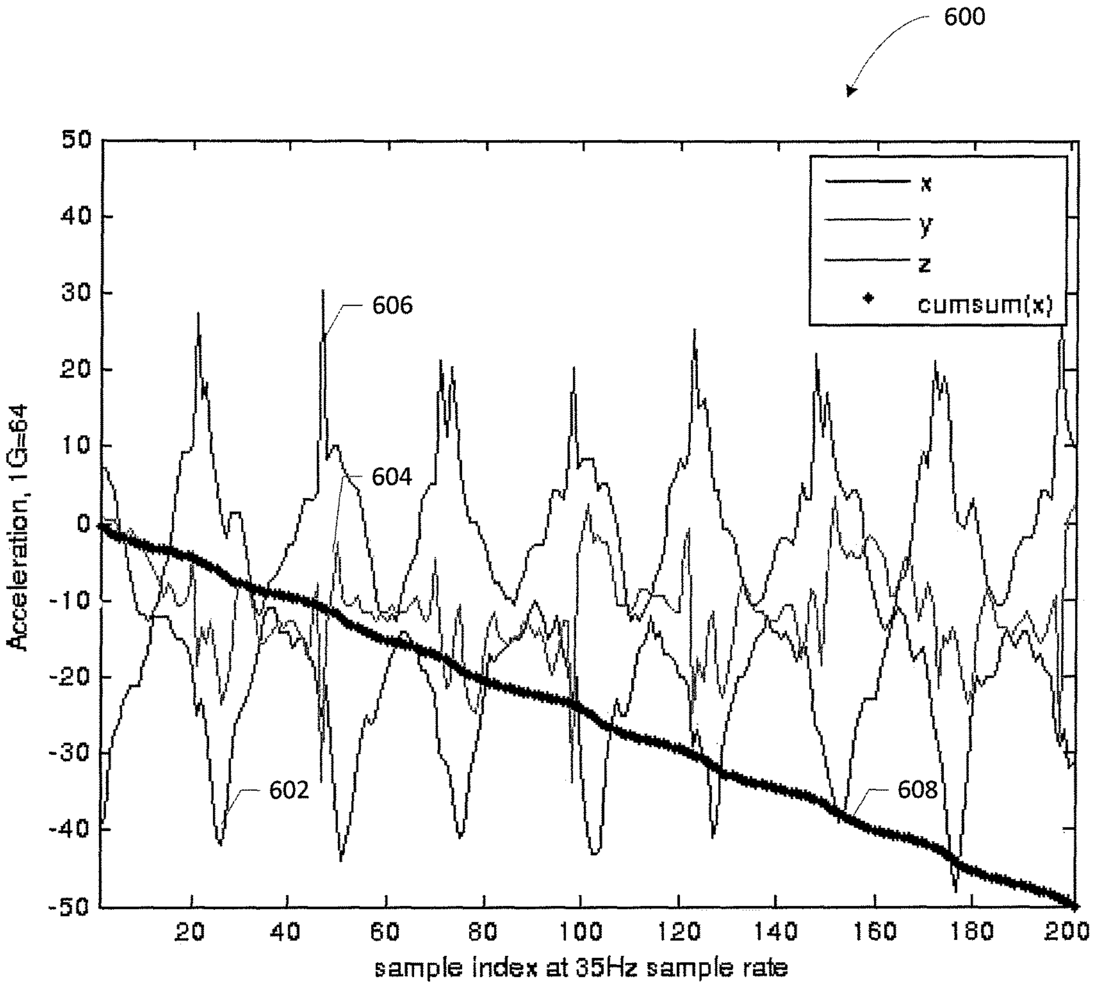
Figure 7:
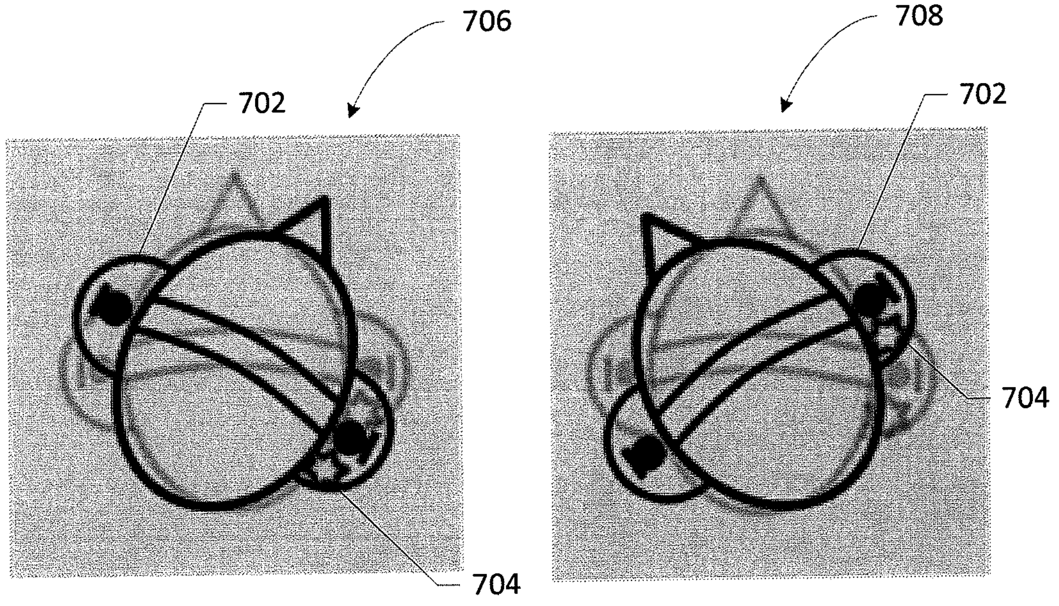
Figure 8:
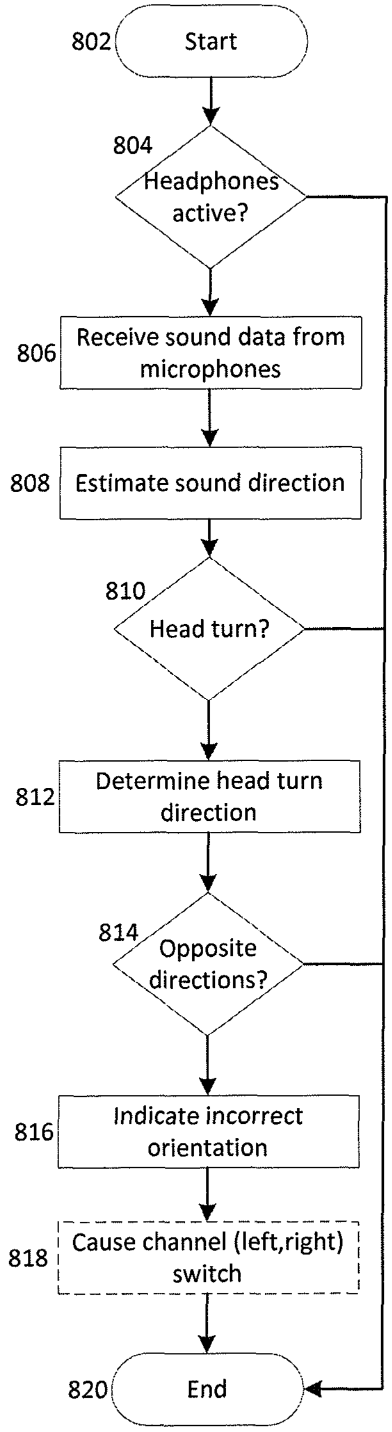
Figure 9:
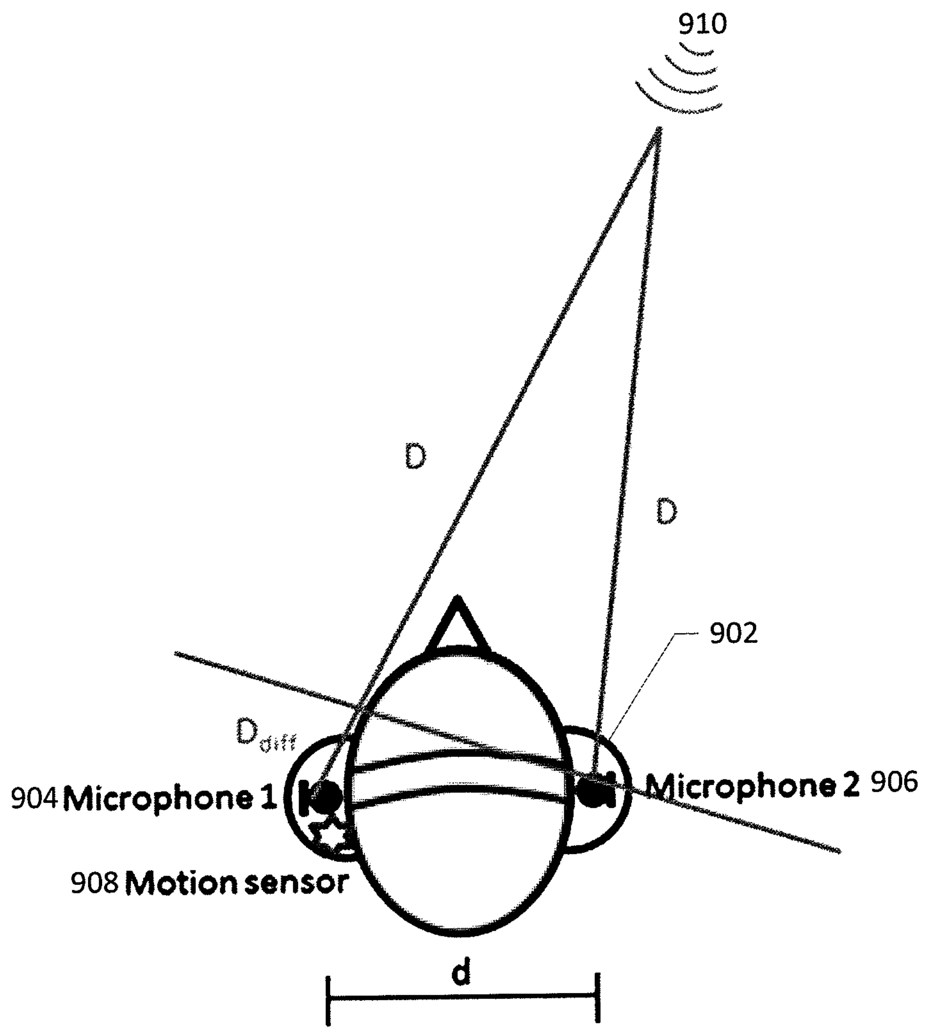
Figure 10:
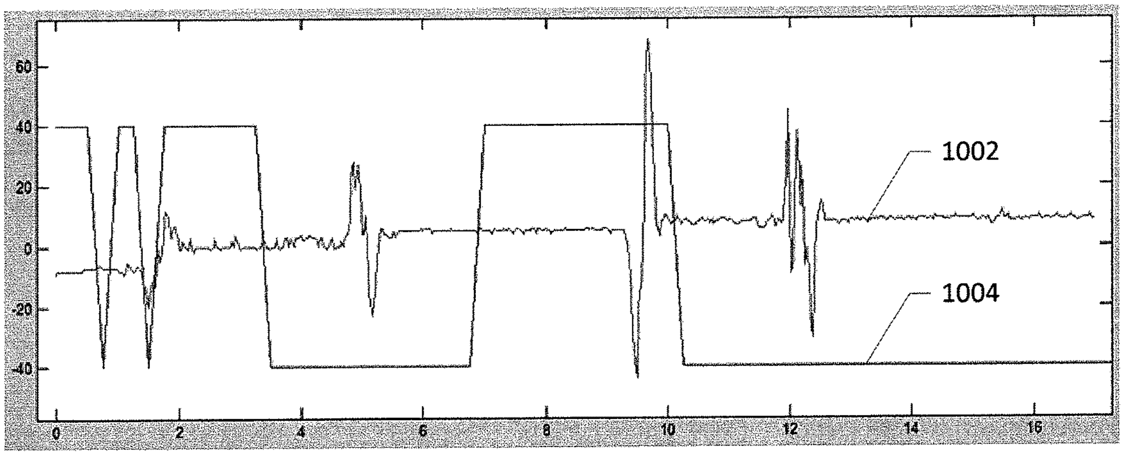
Figure 11:
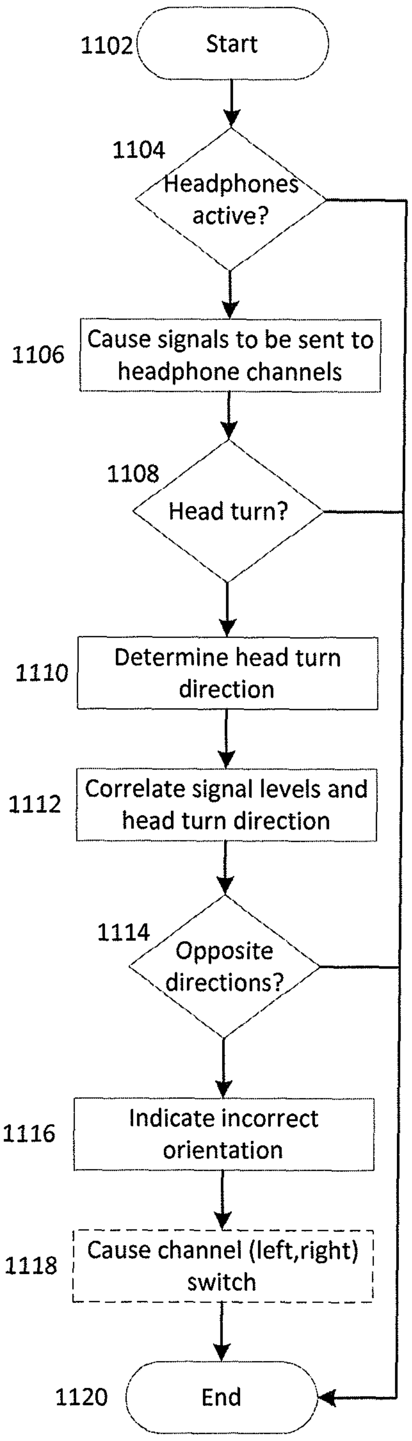

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 illustrates a depiction of a user wearing headphones equipped with motion tracking sensors in accordance with an example embodiment of the present invention;

FIG. 3 is a flow chart illustrating operations performed by an apparatus of FIG. 1 that is specifically configured in accordance with an example embodiment of the present invention;

FIG. 4 is a flow chart illustrating operations performed by an apparatus of FIG. 1 that is specifically configured in accordance with an example embodiment of the present invention;

FIGS. 5 and 6 depict sample accelerometer signals measured by an apparatus in accordance with an example embodiment of the present invention;

FIG. 7 illustrates a depiction of a headphone device in accordance with an example embodiment of the present invention;

FIG. 8 is a flow chart illustrating operations performed by an apparatus of FIG. 1 that is specifically configured in accordance with an example embodiment of the present invention;

FIG. 9 illustrates a depiction of a headphone device capable of performing operations in accordance with an example embodiment of the present invention;

FIG. 10 illustrates sample accelerometer and sound direction signals measured by an apparatus in accordance with an example embodiment of the present invention;

FIG. 11 is a flow chart illustrating operations performed by an apparatus of FIG. 1 that is specifically configured in accordance with an example embodiment of the present invention.

Figure 12:
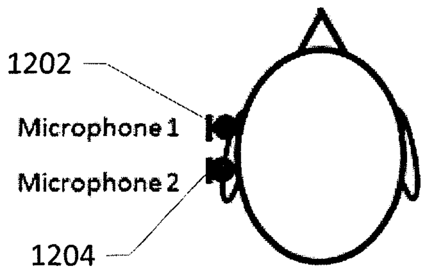
Figure 13:
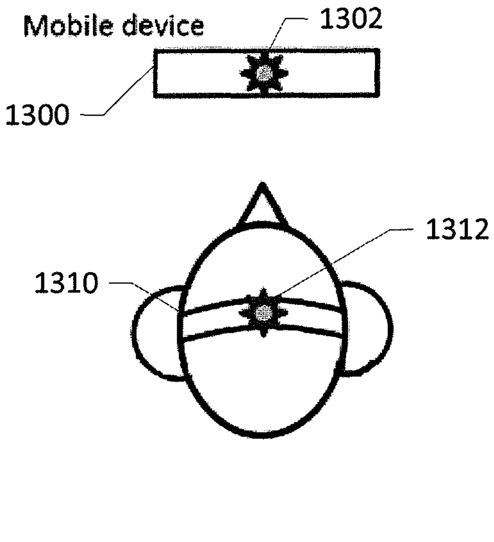
Figure 14:
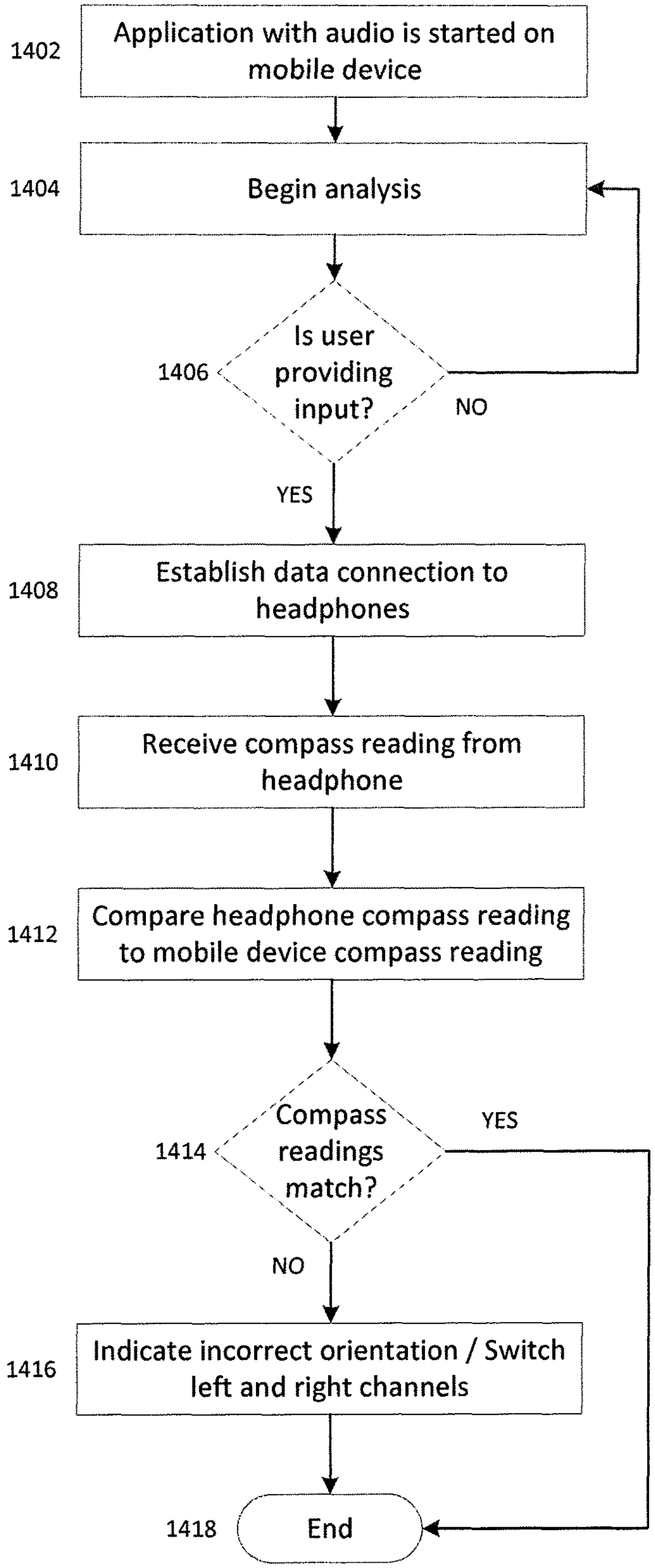

FIG. 12 illustrates a depiction of a headphone device in accordance with another example embodiment of the present invention;

FIG. 13 illustrates a depiction of a headphone device in accordance with another example embodiment of the present invention; and FIG. 14 is a flow chart illustrating operations performed by an apparatus of FIG. 1 that is specifically configured in accordance with an example embodiment of the present invention

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are therefore provided according to an example embodiment of the present invention indicate or automatically configure headphone channel orientation based on a physical orientation determination. Such embodiments remove the need for a user to look at orientation markings on headphones before putting them on, and instead may provide for automatically correcting the orientation of the headphones.

When using headphones the user always needs to check that the headphones are oriented correctly, i.e. the right speaker cup placed to the right ear and the left speaker cup placed to the left ear. Ensuring the correct orientation is particularly important when a user is listening to audio with spatial content, like stereo, binaural or multichannel audio or when playing games or following driving instructions with artificially spatialized content. An system that automatically detects, and optionally corrects, which way the headphones are oriented would remove the need for a user look at the headphones and check the designated orientation before putting them on. This may be particularly useful when a user is walking or running and it is more difficult to see the orientation markings on the headphones or while driving a car when looking at the headphones could be a distraction and a safety risk.

Headphones are increasingly equipped with different sensors. For example, microphones placed in headphones may be used for active noise cancellation and motion sensors placed in headphones may be used for head tracking applications. These added sensors can also be used for additional purposes. For example, a magnetometer and an accelerometer can be used together to track the trajectory of the headphones. Such sensors can also be used to detect whether the headphone motion is caused by walking or driving a car, for example.

In one example embodiment, a GPS sensor in the headphones may detect the direction of motion of the headphones (and the user) and an accelerometer may detect when the user is moving in a particular way, e.g. walking or running. Such headphone motion information may be used to determine if the user is wearing the headphones in the correct orientation. The user may then be notified if the headphone orientation is incorrect or the channel order (left, right) of the headphones may automatically be switched to correct the orientation.

In another example embodiment, an accelerometer in headphones may be used to detect the direction of acceleration after a heel strike when a user is walking or running. This information may be used to determine if the user is wearing the headphones in the correct orientation. The user may then be notified if the headphone orientation is incorrect or the channel order (left, right) of the headphones may automatically be switched to correct the orientation.

In another example embodiment, two or more microphones in the headphones (e.g. at least one microphone in each side of the headphones) may be used to detect the direction of sound. Upon hearing a sound a user often turns his head towards these sound events. A motion sensor in the headphones may be used to detect the direction where the user turned his head after the sound event occurred. If the direction the user turned his head correlates well with the direction of the sound events, then the headphones are oriented correctly. Otherwise, the user may be notified that the headphones are oriented incorrectly or the channel order (left, right) of the headphones may automatically be switched to correct the orientation. In alternative embodiments, different signals may be played on the alternate sides of the headphones, and these signals may be correlated to the direction that the user turns his head to determine whether the headset orientation is correct.

The system of an embodiment of the present invention may include an apparatus 100 as generally described below in conjunction with FIG. 1 for performing one or more of the operations set forth by FIGS. 3, 4, 8, and 11 and also described below. In this regard, the apparatus may be embodied by headphones, a mobile device, or the like.

It should also be noted that while FIG. 1 illustrates one example of a configuration of an apparatus 100 for providing an orientation free hands free device, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, an apparatus 100 for providing an orientation free handsfree device in accordance with one example embodiment may include or otherwise be in communication with one or more of a processor 102, a memory 104, a user interface 106, and a communication interface 108.

In some embodiments, the processor (and/or co-processors or any other processing circuitry assisting or otherwise associated with the processor) may be in communication with the memory 104 via a bus for passing information among components of the apparatus. The memory device 104 may include, for example, a non-transitory memory, such as one or more volatile and/or non-volatile memories. In other words, for example, the memory 104 may be an electronic storage device (e.g., a computer readable storage medium) comprising gates configured to store data (e.g., bits) that may be retrievable by a machine (e.g., a computing device like the processor). The memory 104 may be configured to store information, data, content, applications, instructions, or the like for enabling the apparatus to carry out various functions in accordance with an example embodiment of the present invention. For example, the memory 104 could be configured to buffer input data for processing by the processor 102. Additionally or alternatively, the memory 104 could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 100 may optionally include a user interface 106 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

Meanwhile, the communication interface 108 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus is embodied as headphones, the apparatus 100 may also include a sensor 110, such as a GPS receiver, an accelerometer, and/or the like that may be in communication with the processor 102 and may be configured to detect changes in position, motion and/or orientation of the apparatus.

In some example embodiments, the apparatus 100 may be embodied in the headphones. In such an embodiment, a processor, such as processor 102, may perform the operations described herein to determine headphone orientation, using sensor data from sensors, such as sensor 110, and audio data available in the apparatus embodied in the headphones. In such an embodiment, any required channel switching to correct the orientation may also be performed within the apparatus embodied in the headphones. In other example embodiments, features of the apparatus may be embodied in the headphones and a device, such as a mobile device, that sends audio signals to the headphones. In such embodiments, a processor, such as processor 102, in the device may perform the operations described herein to determine headphone orientation. Such an embodiment may, for example, be used when headphones do not possess enough processing power to perform the operations. In some example embodiments, the sensor data may be determined by sensors embodied in the headphones and such sensor data may then be transmitted to the device for processing. In some embodiments, such transmission may be done using a wireless connection, such as Bluetooth, or a wired connection between the headphones and the device. In some embodiments, operations for channel switching to correct the orientation may be performed by the device.

In an example embodiment, headphones may include a 3-axis accelerometer and a GPS sensor. The accelerometer may be used to detect a user activity, such as walking or running, and the GPS sensor may be used to determine the trajectory of a user (and the headphones).

People usually walk or run in a forward direction. In this example embodiment, when the user activity is detected as walking or running by the accelerometer, the trajectory may be determined using the GPS sensor. If the trajectory (while walking or running) is forwards (i.e. towards the same direction as the headphone front side), then the headphones are likely oriented correctly.

FIG. 2 illustrates a depiction of a user wearing headphones equipped with motion tracking sensors according to such an example embodiment. Diagram 202 illustrates a side view of a user from the right, with a direction vector x toward the front of the user and a direction vector z toward the ground. Diagram 204 illustrates a view of a user from the top, with a direction vector x again toward the front of the user and a direction vector y toward the right side of the user. In the example embodiment, these direction vectors may be used in conjunction with the sensors in determining the orientation of the headphones.

FIG. 3 illustrates a flowchart of operations, which may be performed by an apparatus, such as apparatus 100, to determine headphone orientation according to one example embodiment. Operation for determining the headphone orientation may start at block 302.

In this regard, the apparatus 100 may include means, such as the processor 102, or the like, for determining that the headphones are active. See block 304 of FIG. 3. If at block 304, apparatus 100 determines that there is the headphones are not active, operation may continue to block 320 where operation ends. If at block 304, apparatus 100 determines that the headphones are active, operation may continue to block 306.

The apparatus 100 may include means, such as the processor 102, memory 104, sensors 110, or the like, for generating sensor data regarding motion and trajectory of the headphones, such as by using a GPS sensor and an accelerometer embodied within the headphones, for example. See block 306 of FIG. 3.

As shown in block 308 of FIG. 3, the apparatus 100 may also include means, such as the processor 102, memory 104, or the like, for analyzing the sensor data, such as from an accelerometer, to detect motion activity of the headphones (i.e. the user), such as walking or running, for example. As shown in block 310 of FIG. 3, the apparatus 100 may also include means, such as the processor 102, memory 104, or the like, for determining if the motion is a designated type, such as walking or running. If at block 310, apparatus 100 determines that there is no motion, or if the motion is not running or walking, for example, operation may continue to block 320 where operation ends. If at block 308, apparatus 100 determines that there is motion, such as running or walking, for example, operation may continue to block 312.

As shown in block 312 of FIG. 3, the apparatus 100 may also include means, such as the processor 102, memory 104, or the like, for analyzing the sensor data, such as from a GPS sensor, to estimate a trajectory of the headphones (i.e. the user). As shown in block 314 of FIG. 3, the apparatus 100 may also include means, such as the processor 102, memory 104, or the like, for comparing if the estimated trajectory to the headset orientation. If at block 314, apparatus 100 determines that the estimated trajectory is in a forward direction compared to the headset orientation, operation may continue to block 320 where operation ends. If at block 314, apparatus 100 determines that the estimated trajectory is in a backward direction compared to the headset orientation, operation may continue to block 316.

In one example embodiment, the apparatus determines the direction of movement of the user (i.e. headphones) as a vector $\underline{v}$ in three dimensions. The apparatus may then evaluate whether the movement vector $\underline{v}$ is closer to a forward direction $\underline{x}$ or a backward direction $-\underline{x}$, as illustrated in FIG. 2. For example, the apparatus, using the processor 102, memory 104, or the like, may calculate the Euclidean distance between $\underline{v}$ and $\underline{x}$, and $\underline{v}$ and $-\underline{x}$, and determine that the movement direction is forward if the Euclidean distance between $\underline{x}$ and $\underline{v}$ is smaller than the Euclidean distance between $\underline{v}$ and $-\underline{x}$. If the distances are determined to be equal, the apparatus may determine that either there is no movement or the movement is on the plane defined by the $\underline{z}$ and $\underline{y}$ vectors, as illustrated in FIG. 2. Alternatively or additionally, the apparatus may compare the calculated Euclidean distance to a threshold value; such that the direction of movement must be outside a predefined threshold from the forward direction $\underline{x}$ before the apparatus takes any action regarding the headphone orientation.

As shown in block 316 of FIG. 3, the apparatus 100 may also include means, such as the processor 102, memory 104, user interface 106, communication interface 108, or the like, for indicating that the headphone orientation is incorrect. For example, in some embodiments, the apparatus 100 may send an indication to the user interface, such as the headphone speakers, to alert the user that the headphones are oriented incorrectly and should be reversed. Additionally or alternatively, in some example embodiments, apparatus 100 may also include means, such as the processor 102, memory 104, communication interface 108, or the like for causing the headphone channels to be switched to correct the orientation automatically. See block 318 of FIG. 3. Operation may then continue to block 320 where operations end.

In another example embodiment, headphones may include a 3-axis accelerometer. The accelerometer may be used to detect a user activity, such as walking or running, and the accelerometer data may be used to determine the point of a heel strike of a user. See, e.g. Xi Long et Al.: "Single-accelerometer-based daily physical activity classification", EMBC 2009, International Conference of the IEEE, 2009, Page(s): 6107-6110 and Yoonseon Song et Al.: "Speed Estimation From a Tri-axial Accelerometer Using Neural Networks", Proceedings of the 29th Annual International Conference of the IEEE EMBS, Cité Internationale, Lyon, France, Aug. 23-26, 2007.

FIG. 4 illustrates a flowchart of operations, which may be performed by an apparatus, such as apparatus 100, to determine headphone orientation according to one example embodiment. Operation for determining the headphone orientation may start at block 402.

In this regard, the apparatus 100 may include means, such as the processor 102, or the like, for determining that the headphones are active. See block 404 of FIG. 4. If at block 404, apparatus 100 determines that there is the headphones are not active, operation may continue to block 420 where operation ends. If at block 404, apparatus 100 determines that the headphones are active, operation may continue to block 406.

The apparatus 100 may include means, such as the processor 102, memory 104, sensors 110, or the like, for generating sensor data regarding motion of the user (i.e. headphones, such as by using an accelerometer embodied within the headphones, for example. See block 406 of FIG. 4.

As shown in block 408 of FIG. 4, the apparatus 100 may also include means, such as the processor 102, memory 104, or the like, for analyzing the sensor data, such as from an accelerometer, to detect motion activity of the user (i.e. the headphones), such as walking or running, for example. As shown in block 410 of FIG. 4, the apparatus 100 may also include means, such as the processor 102, memory 104, or the like, for determining if the motion is a designated type, such as walking or running. If at block 410, apparatus 100 determines that there is no motion, or if the motion is not running or walking, for example, operation may continue to block 420 where operation ends. If at block 410, apparatus 100 determines that there is motion, such as running or walking, for example, operation may continue to block 412.

As shown in block 412 of FIG. 4, the apparatus 100 may also include means, such as the processor 102, memory 104, or the like, for analyzing the sensor data, such as from an accelerometer, to estimate a heel strike direction of the user. As shown in block 414 of FIG. 4, the apparatus 100 may also include means, such as the processor 102, memory 104, or the like, for comparing the estimated heel strike direction to the headset orientation. If at block 414, apparatus 100 determines that the estimated heel strike direction is in a forward direction compared to the headset orientation, operation may continue to block 420 where operation ends. If at block 414, apparatus 100 determines that the estimated heel strike direction is in a backward direction compared to the headset orientation, operation may continue to block 416.

As shown in block 416 of FIG. 4, the apparatus 100 may also include means, such as the processor 102, memory 104, user interface 106, communication interface 108, or the like, for indicating that the headphone orientation is incorrect. For example, in some embodiments, the apparatus 100 may send an indication to the user interface, such as the headphone speakers, to alert the user that the headphones are oriented incorrectly and should be reversed. Additionally or alternatively, in some example embodiments, apparatus 100 may also include means, such as the processor 102, memory 104, communication interface 108, or the like for causing the headphone channels to be switched to correct the orientation automatically. See block 418 of FIG. 4. Operation may then continue to block 420 where operations end.

FIGS. 5 and 6 depict accelerometer signals measured from an accelerometer held on the head of a person, according to an example embodiment performing operations of FIG. 4. In FIG. 5, the axes of the device are the same as illustrated in FIG. 2 (i.e. the headphone is in the right orientation). In FIG. 6, the device was turned around so that positive x axis points the back (i.e. the headphone is in an incorrect orientation). In the sample data, the signals have been created such that the long term average which contains a possible bias and the gravity component have been subtracted. The scale of the signals is such that 1G equals 64 (the output was from an 8-bit accelerometer).

As illustrated in FIG. 5, line 502 denotes the x acceleration, line 504 denotes the y acceleration, line 506 denotes the z acceleration, and line 508 displays the cumulative sum of frontal (x) acceleration values. As illustrated in FIG. 6, line 602 denotes the x acceleration, line 604 denotes the y acceleration, line 606 denotes the z acceleration and line 608 displays the cumulative sum of frontal (x) acceleration values. In both FIGS. 5 and 6, the heel strike can be seen as peaks in the z component, lines 506 and 606.

In an example embodiment according to the operations of FIG. 4, if the frontal accelerometer (x) after the heel strike, for example in the next 100 ms, shows acceleration forwards (i.e. the curve is increasing), that is taken as an indication that headphones are probably oriented correctly (naturally assuming that the user is walking forwards not backwards). If the majority of the accelerations after the heel strike during a time interval, for example 1 minute, show acceleration forwards, then it is assumed that the headphones are oriented correctly. Otherwise, the user may be notified, such as with a sound, that the headphones should be changed to orient correctly or the left and right channels may be switched automatically. In FIGS. 5 and 6, the cumulative sum of the frontal accelerometer signal values over the measurement window has been plotted. The cumulative sum has been normalized by dividing with its maximum value and multiplying by 50 to make it fit the window. It can be observed that the cumulative sum for the frontal accelerometer shows a clear increasing trend when the device is oriented the correct way (FIG. 5) and a clear decreasing trend when the device is oriented the wrong way (FIG. 6). The calculation of the cumulative sum may be limited to the short time period, such as 100 ms, after each heel strike.

In another example embodiment, headphones may include an accelerometer or magnetometer. The accelerometer or magnetometer may be used to detect when a user turns his head to the left or right, such as looking to a location of a sound source. For example, a magnetometer may be used to check for head rotation or an accelerometer may be used to check for movement to front or to back, such as illustrated in FIG. 7. FIG. 7 illustrates a user wearing headphones 702 having a sensor 704, such as an accelerometer or magnetometer to detect the user turning his head right 706 or left 708. In an example embodiment as illustrated in FIG. 7, turning the head right 706 moves the sensor backward and turning the head left 708 moves the sensor forward.

FIG. 8 illustrates a flowchart of operations, which may be performed by an apparatus, such as apparatus 100, to determine headphone orientation according to one example embodiment. Operation for determining the headphone orientation may start at block 802.

In this regard, the apparatus 100 may include means, such as the processor 102, or the like, for determining that the headphones are active. See block 804 of FIG. 8. If at block 804, apparatus 100 determines that there is the headphones are not active, operation may continue to block 820 where operation ends. If at block 804, apparatus 100 determines that the headphones are active, operation may continue to block 806.

The apparatus 100 may include means, such as the processor 102, memory 104, sensors 110, user interface 108, or the like, for capturing sound signals, such as using microphones embodied in the headphones. See block 806 of FIG. 8.

As shown in block 808 of FIG. 8, the apparatus 100 may also include means, such as the processor 102, memory 104, or the like, for analyzing the sound signals to estimate the direction of the sound, such as to the right or left of the user (i.e. the headphones). As shown in block 810 of FIG. 8, the apparatus 100 may also include means, such as the processor 102, memory 104, sensors 110, or the like, for determining whether a user has turned his head or a head turn position, such as using an accelerometer or magnetometer. If at block 810, apparatus 100 determines that there is no head turn, operation may continue to block 820 where operation ends. If at block 810, apparatus 100 determines that there is head turn motion, operation may continue to block 812.

As shown in block 812 of FIG. 8, the apparatus 100 may also include means, such as the processor 102, memory 104, or the like, for analyzing the sensor data, such as from an accelerometer or magnetometer, to determine the direction of the user head turn or the head turn position. As shown in block 814 of FIG. 8, the apparatus 100 may also include means, such as the processor 102, memory 104, or the like, for comparing the head turn direction or position to the estimated sound direction. If at block 814, apparatus 100 determines that the head turn direction corresponds to the estimated sound direction, operation may continue to block 820 where operation ends. If at block 814, apparatus 100 determines that that the head turn direction does not correspond to the estimated sound direction, operation may continue to block 816.

As shown in block 816 of FIG. 8, the apparatus 100 may also include means, such as the processor 102, memory 104, user interface 106, communication interface 108, or the like, for indicating that the headphone orientation is incorrect. For example, in some embodiments, the apparatus 100 may send an indication to the user interface, such as the headphone speakers, to alert the user that the headphones are oriented incorrectly and should be reversed. Additionally or alternatively, in some example embodiments, apparatus 100 may also include means, such as the processor 102, memory 104, communication interface 108, or the like for causing the headphone channels to be switched to correct the orientation automatically. See block 818 of FIG. 8. Operation may then continue to block 820 where operations end.

In an example embodiment, the sound source direction may be determined relative to the positions of two or more microphones. In an example embodiment, a look up table for the effect of respective microphone signals toward a determined position may be provided for use in determining if the headphone orientation is correct. For example, the sensitivity or acoustic characteristic of the respective microphone signal may be known for a given direction and received signal characteristics could be compared to such known values in the look-up table to determine source direction. Such microphone signals may also depend on other factors such as distance, environmental characteristics, etc.

In an example embodiment performing the operations of FIG. 8, the headphones may include at least two microphones, spaced at least some distance apart on the y axis (as illustrated in FIG. 2), such as a distance of at least 0.5 cm, for example. In some embodiments, the microphones may be placed on each side of the headphones, i.e. near the ears, as illustrated in FIG. 9. FIG. 9 illustrates an example embodiment for performing the operations of FIG. 8, with a user wearing headphones 902. The headphones 902 may include microphones 904 and 906 on opposite sides of the headphones 902 and include sensor 908 for detecting head turn movement.

The at least two microphones, such as microphones 904 and 906 may be used to capture sounds at all times to use in determining headphone orientation. For example, microphone 904 may capture sound signal M1 (left channel/ear) and microphone 906 may capture sound signal M2 (right channel/ear) from the same source sound 910. According to an example embodiment, when a user turns his head toward the direction of the sound 910, a correlation may be calculated between the microphone signals for a short time duration, for example 1 second, before the head turning occurred, such as using Equation 1:

$$\text{correlation} = \max_{\tau} \sum_{t=-1}^{0} M_1(t)M_2(t-\tau),\ -\frac{d}{v} \le \tau \le +\frac{d}{v}, \tag{1}$$

where d is the distance between the microphones and v is the speed of sound. τ is the time is takes from sound to travel distance $D_{Diff}$ shown in FIG. 9. τ may be limited because delays larger than the separation of the microphones (distance d) are not meaningful. If τ that gives the maximum correlation is positive, then the sound arrived to microphone 906 first. If sound arrived to microphone 906 first and the user turns his head to the right, it is an indication that the user turned his head towards the sound and that the headphones are oriented correctly.

In some embodiments, where an apparatus is configured to determine sound direction using the two or more microphones, the microphones may be placed close together. In some embodiments, when used to detect sounds coming from the right or left, the microphones should be placed such that there is some right/left separation between the microphones. In some embodiments, when used to detect sounds coming from the front or back, the microphones should be placed such that there is some front/back separation between the microphones.

In some embodiments, the microphones may be placed on the same side of the headphones (e.g., on the same side of the head) instead of on both sides of the headphones. In such embodiments, there only needs to be some distance between the microphones in the y-axis direction (as illustrated in FIG. 2). In such embodiments, some distance between the microphones in the x-axis direction or in the z-axis direction may be allowable, but any distance between the microphones in the x-axis direction or in the z-axis direction should be smaller than the y-axis distance between the microphones.

FIG. 10 illustrates example accelerometer data, line 1002, for turning head to right, then left, then right, then left, where an accelerometer was located in the right headphone. When the user turns his head to the right, the x-axis accelerometer data has first a negative peak followed by a positive peak. When turning his head to the left, the situation is reversed, first a positive peak then a negative peak. FIG. 10 further illustrates example sound direction data, line 1004 calculated using Equation 1 above, with +40 indicating that the sound has been detected to originate from right and −40 indicating it originates from the left left. FIG. 10 illustrates that since the headphones are oriented correctly, the sound direction data (1004) matches to the accelerometer data (1002) well in three out of 4 cases. As seen in the sample, the sound direction may be detected wrong before the first head turn depending on which time instant the correlation is calculated, but the remaining sound directions are detected correctly. In some embodiments, filtering for averages and removing acceleration caused by walking may be done to improve the results.

In an example embodiment, the apparatus may constantly track head movements and calculate correlation to sound direction when the movement is significant. For example, if a user turns his head to right, $\tau$ is positive and above a threshold A and the correlation exceeds a threshold B, it is an indication that the headphones are oriented correctly. If user turns his head to left, $\tau$ is negative and below a threshold −A and the correlation exceeds a threshold B, it is an indication that the headphones are oriented correctly. If user turns his head to right, $\tau$ is negative and below a threshold −A and the correlation exceeds a threshold B, it is an indication that the headphones are oriented incorrectly. If user turns his head to left, $\tau$ is positive and above a threshold A and the correlation exceeds a threshold B, it is an indication that the headphones are oriented incorrectly. In some embodiments, if there are significantly more indications that the headphones are oriented incorrectly than indications that the headphones were oriented correctly, the user may be notified that the headphones are oriented incorrectly or the channel order (left, right) may be automatically switched.

In another example embodiment, the microphone signals may be replaced by signals M1 and M2 that are played back to the user over the headphones and the correlation calculation is replaced by level difference, as illustrated in FIG. 11. In yet another embodiment, the user may be sent a message to look to the right or the left over the headphones and the apparatus may then track that movement to verify whether the headphones are oriented correctly.

FIG. 11 illustrates a flowchart of operations, which may be performed by an apparatus, such as apparatus 100, to determine headphone orientation according to one example embodiment. Operation for determining the headphone orientation may start at block 1102.

In this regard, the apparatus 100 may include means, such as the processor 102, or the like, for determining that the headphones are active. See block 1104 of FIG. 11. If at block 1104, apparatus 100 determines that there is the headphones are not active, operation may continue to block 1120 where operation ends. If at block 1104, apparatus 100 determines that the headphones are active, operation may continue to block 1106.

The apparatus 100 may include means, such as the processor 102, memory 104, sensors 110, user interface 108, or the like, for causing the output of audio signals on the headphone channels (left, right). See block 1106 of FIG. 11.

As shown in block 1108 of FIG. 11, the apparatus 100 may also include means, such as the processor 102, memory 104, sensors 110, or the like, for determining whether a user has turned his head, such as using an accelerometer or magnetometer. If at block 1108, apparatus 100 determines that there is no head turn, operation may continue to block 1120 where operation ends. If at block 1108, apparatus 100 determines that there is head turn motion, operation may continue to block 1110.

As shown in block 1110 of FIG. 11, the apparatus 100 may also include means, such as the processor 102, memory 104, or the like, for analyzing the sensor data, such as from an accelerometer or magnetometer, to determine the direction of the user head turn or head turn position. As shown in block 1112 of FIG. 11, the apparatus 100 may also include means, such as the processor 102, memory 104, or the like, for correlating the head turn direction to the signal characteristics by analyzing at least one of the one or more audio signal characteristics of the channels and the head turn position. If at block 1114, apparatus 100 determines that the head turn direction correlates to the one or more audio signal characteristics, operation may continue to block 1120 where operation ends. If at block 1114, apparatus 100 determines that that the head turn direction does not correlate to the one or more audio signal characteristics, operation may continue to block 1116. In some example embodiments, the analysis of the one or more audio signal characteristics may comprise analysis of one or more of a difference in audio signal levels between the channels relative to the head turn position, a difference in audio signal arrival times between the channels relative to the determined head turn position, or a difference in audio signal spectrums between the channels relative to the determined head turn position. In some embodiments, the analysis may comprise comparing the one or more audio signal characteristics relative to a predefined threshold.

As shown in block 1116 of FIG. 11, the apparatus 100 may also include means, such as the processor 102, memory 104, user interface 106, communication interface 108, or the like, for indicating that the headphone orientation is incorrect. For example, in some embodiments, the apparatus 100 may send an indication to the user interface, such as the headphone speakers, to alert the user that the headphones are oriented incorrectly and should be reversed. Additionally or alternatively, in some example embodiments, apparatus 100 may also include means, such as the processor 102, memory 104, communication interface 108, or the like for causing the headphone channels to be switched to correct the orientation automatically. See block 1118 of FIG. 11. Operation may then continue to block 1120 where operations end.

For example, in some embodiments, if user turns his head to right and M2 is louder than M1 by a margin C, it is an indication that the headphones are oriented correctly. If user turns his head to left and M1 is louder than M2 by a margin C, it is an indication that the headphones are oriented correctly. If user turns his head to right and M1 is louder than M2 by a margin C, it is an indication that the headphones are oriented incorrectly. If user turns his head to left and M2 is louder than M1 by a margin C, it is an indication that the headphones are oriented incorrectly.

In some example embodiments, the analysis of the sound or audio signal characteristics may include differences in audio signal levels, audio signal spectrums, e.g. frequency responses or impulse responses, time or phase differences between channels, or the like.

In another example embodiment, when a user is not mobile, i.e. sitting on a chair or lying on a bed, and assuming there are no sound sources around, then the user may generate a sound source himself, such as by clapping hands or flicking fingers, to calibrate the headphone channel orientation using the generated impulsive sound. Such an embodiment may provide a self-calibration process for the headphone orientation based on the acoustic signals where the apparatus may analyze the interaural differences, i.e. time delays, intensity difference, phase difference, at the headphone microphone positions of the respective ears. In such an embodiment, external sound sources are not necessary to provide the headset orientation correction and the user may generate a sound source himself for use in calibration and channel detection.

In another example embodiment, the headphones may be in-ear headphones and the in-ear headphones may comprise two microphones on one side (either the left or right ear-piece), where one is slightly more forward and the other is slightly more backward, as illustrated in FIG. 12. As shown in FIG. 12, microphone 1202 is closer to the front of the user's head and microphone 1204 is closer to the back of the user's head. In such an embodiment, the shadowing from the ear or head may be used as a cue in determining the headphone orientation. The ear or head attenuates sounds coming to the two microphones differently based on the direction from which the sound comes from. Such difference may be most clear at high frequencies, such as 8000-12000 Hz, for example. Sound may be recorded using the two microphones and may be divided into short time segments, such as 20 ms for example, for analysis. A correlation may be calculated between the two signals of the two microphones as follows:

$$\text{correlation} = \max_{\tau} \sum_{t=0}^{20ms} M_1(t) M_2(t-\tau),\ -\frac{d}{v} \le \tau \le +\frac{d}{v},$$

where d is the distance between the microphones and v is the speed of sound. $\tau$ may be limited because delays larger than the separation of the microphones may not be meaningful for the analysis. If $\tau$ that gives the maximum correlation is positive, then the sound arrived to microphone 2 first, i.e. the sound is coming from behind the user and vice versa. When the sound is coming from behind the user it is shadowed by the head and thus has smaller energy in high frequencies than in low frequencies. This can be compared by taking a FFT transform of the signal $M_1$ or $M_2$ and comparing the energy or e.g. frequencies 8-12 kHz to the energy of frequencies 1-6 kHz. If the energy difference matches to the detected direction in the correlation calculation then the headphones are oriented correctly otherwise they are oriented incorrectly. The results from several time segments can be combined to detect if the headphones are oriented correctly or not. The correlation may be calculated between bandlimited versions of the microphone signals.

In another example embodiment, two compasses may be used to detect the headphone orientation relative to a mobile device while the user is providing input to the mobile device. Users generally look at their mobile devices while they are using them. In particular, it is difficult to use the touchscreen of a mobile device without looking at it. Therefore, there may be a relationship between the mobile device orientation and the headphone orientation when the user is using the touchscreen of the mobile device or providing input to the mobile device. In an example embodiment, when an application with audio output is started on a mobile device, the mobile device may determine if a user is providing input, such as using to a touchscreen, adjusting volume, etc. The device may then compare data from a compass in the device and a compass in the headphones to make a determination if the headphone orientation is correct. In another example embodiment, it may also be possible to use a camera of the mobile device to detect when the user is looking at the device, such as using face recognition.

FIG. 13 illustrates an example embodiment where both the mobile device and the headphones have a built-in compass. As shown in FIG. 13 mobile device 1300 comprises a compass 1302 and headphone 1310 comprises a compass 1312.

FIG. 14 illustrates a flowchart of operations, which may be performed by an apparatus, such as apparatus 100, to determine headphone orientation according to an example embodiment using compasses within a mobile device and a headphone. In this regard, the apparatus 100 may include means, such as the processor 102, memory 104, or the like, for determining that an application with audio output, such as navigation, music player, video player, or the like, has been activated on a mobile device. See block 1402 of FIG. 14. As shown in block 1404 of FIG. 14, the apparatus may then begin the analysis to determine headphone orientation.

The apparatus 100 may include means, such as the processor 102, memory 104, user interface 108, or the like, for detecting whether a user is providing input, such as using a touchscreen, adjusting volume, etc. See block 1406 of FIG. 14. If at block 1406, apparatus 100 determines that there is no user input, operation may return to block 1404 where operation waits for user input to be detected. If at block 1406, apparatus 100 detects user input, operation may continue to block 1408.

As shown in block 1408 of FIG. 14, the apparatus 100 may also include means, such as the processor 102, memory 104, communication interface 108, or the like, for establishing a data connection with the headphone, such as by using Bluetooth, for example. As shown in block 1410 of FIG. 14, the apparatus 100 may also include means, such as the processor 102, memory 104, communication interface 108, or the like, for receiving compass data from the headphone.

The apparatus 100 may include means, such as the processor 102, memory 104, or the like, for comparing the headphone compass data and the mobile device compass data. See block 1412 of FIG. 14. As shown in block 1414 of FIG. 14, the apparatus 100 may also include means, such as the processor 102, memory 104, or the like, for determining if the compass data for the headphone and the mobile device are approximately the same, such as within ±90 degrees of each other, for example. If at block 1414, apparatus 100 determines that the compass data are approximately the same, the apparatus may determine that the headphone orientation is correct and continue to block 1418 where operation ends. If at block 1414, apparatus 100 determines that the compass data are not approximately the same, operation may continue to block 1416.

As shown in block 1416 of FIG. 14, the apparatus 100 may also include means, such as the processor 102, memory 104, user interface 106, or the like, for providing an indication that the headphone orientation is incorrect. Such an indication may include playing a sound or providing an indication on a display that the headphone orientation is incorrect. Alternatively or additionally, the apparatus 100 may include means, such as the processor 102, memory 104, user interface 106, or the like, for causing the left and right channels of the headphone to be switched to correct the orientation. Operation may then continue to block 1418 where operation ends.

As described above, FIGS. 3, 4, 8, 11, and 14 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program instructions, the at least one memory and the computer program instructions configured to, with the at least one processor, cause the apparatus at least to:

determine a physical orientation of a headphone device based on at least a direction and a motion of movement using one or more sensors located within the headphone device, wherein the motion of the movement is determined based on a determination of acceleration or trajectory, using the one or more sensors located within the headphone device, wherein the trajectory is a forward direction or a backward direction, and the direction of the movement is determined using at least another one of the one more or more sensors;

determine whether a user is wearing the headphone device in a correct or an incorrect headphone channel orientation based on the determined physical orientation using the determined motion and direction based on respective outputs from the one or more sensors, the correct headphone channel orientation being a left channel placed to a left ear of the user and a right channel placed to a right ear of the user; and provide an indication of the determined physical orientation or adjust an output channel configuration of the apparatus for the headphone device so that a left output channel is to be provided to the left ear and a right output channel is to be provided to the right ear even when the headphone channel orientation is incorrect.

2. The apparatus according to claim 1, wherein the at least one memory and the computer program instructions configured to, with the at least one processor, further cause the apparatus to at least one of:

determine the orientation of the headphone device based on at least one of:

a head turn position;

a direction of one or more audio signals;

two or more compass data, wherein at least one compass is located in each of the apparatus and the headphone device; and a difference in characteristics of one or more audio signals; and determine the trajectory of the headphone device by a Global Positioning System (GPS) sensor.

3. The apparatus according to claim 2, wherein the at least one memory and the computer program instructions configured to, with the at least one processor, further cause the apparatus to:

receive at least two audio signals based on one or more sound sources from two or more microphones associated with the headphone device;

determine one or more directions based on the received at least two audio signals; and analyze at least one of the determined one or more directions and the head turn position so as to determine an orientation of the headphone device.

4. The apparatus of claim 3, wherein determining the one or more directions based on the received at least two audio signals comprises analyzing at least one of:

a difference in audio signal levels of the at least two audio signals, a difference in audio signal arrival times of the at least two audio signals, and a difference in audio signal spectrums of the at least two audio signals.

5. The apparatus according to claim 3, wherein the head turn position is determined based on at least one of: at least two or more microphone signals, one or more sensors within the headphone device, or a combination of the at least two or more microphone signals and the one or more sensors.

6. The apparatus according to claim 5, wherein the one or more sensors comprise at least one of an accelerometer, a compass, or a magnetometer.

7. The apparatus according to claim 2, wherein the at least one memory and the computer program instructions configured to, with the at least one processor, further cause the apparatus to:

output audio signals on channels of the headphone device; and analyze the one or more audio signal characteristics of the channels and the head turn position so as to determine an orientation of the headphone device.

8. The apparatus according to claim 7, wherein the analysis to determine the orientation comprising the analysis of the one or more signal characteristics is at least one of:

a difference in audio signal levels between the channels relative to the determined head turn position, a difference in audio signal arrival times between the channels relative to the determined head turn position, or a difference in audio signal spectrums between the channels relative to the determined head turn position.

9. The apparatus according to claim 7, wherein the head turn position is determined based on at least one of: the output audio signals, one or more sensors within the headphone device, or a combination of the output audio signals and the one or more sensors.

10. The apparatus according to claim 9, wherein the one or more sensors comprise at least one of an accelerometer, a compass, or a magnetometer.

11. The apparatus according to claim 1, wherein the apparatus comprises a part of the headphone device or an apparatus separate from the headphone device.

12. The apparatus of claim 1, wherein the direction of movement comprises a direction the user is walking or running.

13. A method comprising:

determining a physical orientation of a headphone device based on at least a direction and a motion of movement using one or more sensors located within the headphone device, wherein the motion of the movement is determined based on a determination of acceleration or trajectory, using the one or more sensors located within the headphone device, wherein the trajectory is a forward direction or a backward direction, and the direction of the movement is determined using at least another one of the one more or more sensors;

determining, via a processor, whether a user is wearing the headphone device in a correct or an incorrect headphone channel orientation based on the determined physical orientation using the determined motion and direction based on respective outputs from the one or more sensors, the correct headphone channel orientation being a left channel placed to a left ear of the user and a right channel placed to a right ear of the user; and providing an indication of the determined physical orientation or adjusting an output channel configuration of the apparatus for the headphone device so that a left output channel is to be provided to the left ear and a right output channel is to be provided to the right ear even when the headphone channel orientation is incorrect.

14. The method according to claim 13, further comprising at least one of:

determining the orientation of the headphone device is further based on at least one of:

a head turn position;

a direction of one or more audio signals;

two or more compass data, wherein at least one compass is located in each of the apparatus and the headphone device; and a difference in characteristics of one or more audio signals; and determining the trajectory of the headphone device by a Global Positioning System (GPS) sensor.

15. The method according to claim 14, further comprising:

receiving at least two audio signals based on one or more sound sources from two or more microphones associated with the headphone device;

determining one or more directions based on the received at least two audio signals; and analyzing at least one of the determined one or more directions and the head turn position so as to determine an orientation of the headphone device.

16. The method according to claim 15, wherein determining the one or more directions based on the received at least two audio signals comprises analyzing at least one of:

a difference in audio signal levels of the at least two audio signals, a difference in audio signal arrival times of the at least two audio signals, and a difference in audio signal spectrums of the at least two audio signals.

17. The method according to claim 15, wherein the head turn position is determined based on at least one of: at least two or more microphone signals, one or more sensors within the headphone device, or a combination of the at least two or more microphone signals and the one or more sensors, wherein the one or more sensors comprise at least one of an accelerometer, a compass, or a magnetometer.

18. The method according to claim 14, further comprising:

outputting audio signals on channels of the headphone device; and analyzing the one or more audio signal characteristics of the channels and the head turn position so as to determine an orientation of the headphone device.

19. The method according to claim 18, wherein the analysis to determine the orientation comprising the analysis of the one or more signal characteristics is at least one of:

a difference in audio signal levels between the channels relative to the determined head turn position, a difference in audio signal arrival times between the channels relative to the determined head turn position, or a difference in audio signal spectrums between the channels relative to the determined head turn position.

20. The method according to claim 18, wherein the head turn position is determined based on at least one of: the output audio signals, one or more sensors within the headphone device, or a combination of the output audio signals and the one or more sensors.

21. The method according to claim 13, wherein the direction of movement comprises a direction the user is walking or running.

22. A computer program product comprising at least one non-transitory computer-readable storage medium bearing computer program instructions embodied therein for use with a computer, the computer program instructions comprising program instructions configured to:

determine a physical orientation of a headphone device based on at least a direction and a motion of movement using one or more sensors located within the headphone device, wherein the motion of the movement is determined based on a determination of acceleration or trajectory, using the one or more sensors located within the headphone device, wherein the trajectory is a forward direction or a backward direction, and the direction of the movement is determined using at least another one of the one more or more sensors;

determine whether a user is wearing the headphone device in a correct or an incorrect headphone channel orientation based on the determined physical orientation using the determined motion and direction based on respective outputs from the one or more sensors, the correct headphone channel orientation being a left channel placed to a left ear of the user and a right channel placed to a right ear of the user; and provide an indication of the determined physical orientation or adjust an output channel configuration of the apparatus for the headphone device so that a left output channel is to be provided to the left ear and a right output channel is to be provided to the right ear even when the headphone channel orientation is incorrect.

* * * * *